United States Patent Office 3,242,161
Patented Mar. 22, 1966

3,242,161
ACETALS OF DIALDEHYDE POLYSACCHARIDES
Peter J. Borchert, Elkhart, Ind., assignor to Miles Laboratories, Inc., Elkhart, Ind., a corporation of Indiana
Filed Oct. 16, 1961, Ser. No. 145,453
No Drawing. Filed Oct. 16, 1961, Ser. No. 145,453
2 Claims. (Cl. 260—209)

This invention relates to novel derivatives of dialdehyde polysaccharides. In one of its more particular aspects this invention relates to acetals of dialdehyde polysaccharides and to methods for their preparation. This application is a continuation-in-part of application Serial Number 40,131, filed July 1, 1960, now abandoned.

Acetals of periodic acid oxidized native corn starch have been obtained by reacting dialdehyde starch with methanolic hydrogen chloride as disclosed in Chem. & Ind., January 11, 1958, page 40. The acetals of dialdehyde starch thus obtained, however, are found to be insoluble in organic solvents. This is believed to be due to the interaction of hemiacetals between macromolecules which results in highly cross-linked polymeric material. This material because of its insolubility is not a desirable resin. These cross-linked polymers are believed to have the type of structure represented by the following formula:

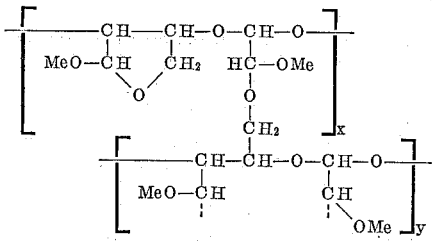

wherein $x$ and $y$ represent the number of repeating units in the dialdehyde starch molecule which have been converted into acetals and may be the same or different. It can be seen from thisf ormula that the aldehyde groups of dialdehyde starch have formed acetals in part by reaction with methanol and in part by intramolecular acetalization with the primary hydroxyl group or intermolecular acetalization with the primary hydroxyl group of another chain of the dialdehyde starch, which results in the formation of a highly cross-linked material.

It is accordingly an object of this invention to provide acetals of dialdehyde polysaccharides which have desirable solubility characteristics.

Another object of this invention is to provide a process for the production of acetals of dialdehyde polysaccharides which results in the formation of dialdehyde polysaccharide acetals which do not have the disadvantages of the prior art acetals.

Another object of this invention is to provide a process for the isolation of dialdehyde polysaccharide acetals which insures that the dialdehyde polysaccharide acetals so produced will have the properties desired.

Another object of this invention is to reduce the formation of cross-linked acetals of periodate oxidized polysaccharides.

A further object of this invention is to provide a relatively easily operable and efficient process for the production of dialdehyde polysaccharide acetals.

Yet a further object of this invention is to provide a process which is capable of stabilizing the acetals produced.

Other objects and advantages of this invention will become apparent during the course of the following detailed disclosure and description.

It has now been found that acetals of dialdehyde polysaccharides which are soluble in a wide variety of organic solvents and thus adaptable to use in various applications can be prepared by means of the use of a suitable reaction system which reduces or eliminates the tendency for formation of cross-linked acetals. Such reaction system is furnished by use of a sufficient excess of the acetalizing alcohol and by means of an appropriately selective catalyst.

The process for preparation of the polymeric acetals of this invention is most advantageously conducted by preparing a suspension of the dialdehyde polysaccharide in the alcohol to be used for the acetalization reaction using a ratio of from about 5 moles to 30 moles of the alcohol per polymer unit of the dialdehyde polysaccharide. The resulting suspension is heated with stirring in the presence of a suitable catalyst at a temperature between about 60° C. and 105° C. A nearly clear solution usually results following the occurrence of a heterogeneous reaction and the swelling of the dialdehyde polysaccharide as it goes into solution. The dialdehyde polysaccharide acetal may be recovered from the resulting solution by precipitation with water or with primary alcohols other than those from which the acetals are formed or secondary alcohols such as isopropanol. If desired, an aqueous alcohol mixure such as an isopropanol-water mixture may be used.

As starting materials for the process of this invention there may be used any dialdehyde polysaccharide such as the periodate oxidized polysaccharides obtained from corn, wheat, potato, rice or tapioca starches, celluloses, dextrans, algins, inulin and the like. These dialdehyde polysaccharides may be conveniently prepared in accordance with the known periodic acid oxidation of polysaccharides. For example, in the case of starch the preparation of dialdehyde starch may be illustrated by means of the following equation:

Equation 1

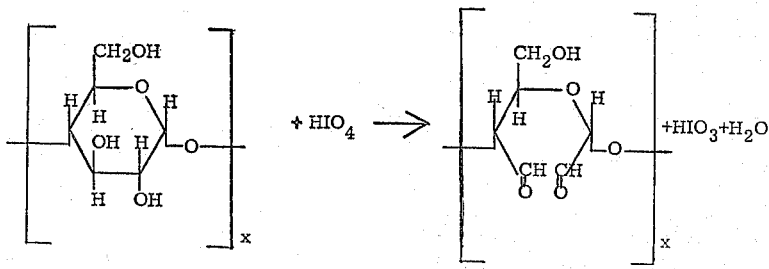

wherein $x$ stands for the number of repeating units in the molecule, which may range from about twenty to as many as several thousand. If desired the electrolytic procedure disclosed in U.S. Patent No. 2,713,553 to Charles L. Mehltretter may be used for preparing these dialdehyde polysaccharides. In general dialdehyde polysaccharides having an extent of oxidation of upwards of from about 89%, that is those wherein 89 out of each 100 anhydroglucose units of the polysaccharide have been converted to the dialdehyde are preferred. In fact, polysaccharides having an oxidation of less than about 75% are not desirable for the purpose of this invention since acetals prepared therefrom do not have the properties sought.

The alcohols which are used for the acetalization reaction are the lower monohydric primary alcohols such as methanol, ethanol and allyl alcohol. Higher saturated primary alcohols such as propanols, butanols and others appear to require much higher temperatures for reaction than methanol and ethanol, and as a result considerable decomposition of the polymeric dialdehyde is found to take place. Ally alcohol, however, is a satisfactory acetalizing agent. The alcohols are used in excess of the stoichiometric amount required for reaction and preferably in a proportion of from about 5 moles to 30 moles per mole of the dialdehyde polysaccharide polymer unit as pointed out above.

The catalyst used is preparing the acetals of this invention is an acid of sulfur, for example, sulfuric acid. An even more preferred catalyst is p-toluenesulfonic acid. The catalyst is appropriately used in a proportion of from about 4 mole percent to 20 mole percent based upon the dialdehyde polysaccharide polymer unit.

Other reaction conditions may be varied to suit the circumstances, but in general elevated temperatures are preferred. For example, at a temperature between about 60° C. and 105° C. the conversion of dialdehyde polysaccharide to the acetal is practically quantitative. Pressures from atmospheric pressure to about 30 p.s.i. may be advantageously used for carrying out the reaction. Times of from one to twenty hours are necessary for conducting the reaction under various reaction conditions. If a relatively short reaction time is desired this may be realized by the use of an autoclave. Indeed, when an autoclave is used, not only is the reaction time shortened but it is found that less catalyst is needed to promote the desired reaction. For example, where the reaction mixture is autoclaved with stirring at temperautres in the range of from about 60° C. to 105° C. and at pressures of from about 10 p.s.i. to 30 p.s.i. a reaction time of from about 1 to 3 hours is sufficient. In addition, a quantity of catalyst of only from about 4 mole percent to 6 mole percent based upon the polymer unit is needed.

As described above, the dialdehyde polysaccharide acetals of this invention may be advantageously isolated by precipitation with water or an alcohol other than the alcohol which is used to accomplish the acetalization reaction. The crude polymeric acetals thereby isolated, which quite frequently are in the form of sticky precipitates, may be purified by dissolving the precipitate in a small amount of acetone and reprecipitating with water or alcohol as before.

The acetals of this invention are generally separated in the form of white powders which are soluble in most organic solvents. For example, the acetals are found to be soluble in benzene, toluene, ethylene glycol monomethyl ether, ethylene glycol monobutyl ether, acetone, methyl ethyl ketone, propyl acetate, chloroform, dimethylformamide, dioxane and other organic solvents. These acetals are also soluble in the alcohol from which they are formed. They are, however, insoluble in water and other primary and secondary alcohols.

As is well known in the art, acetals in general can be split into the alcohols and the aldehydes from which they are formed in aqueous acid solution. The polymeric acetals of this invention can be split into the alcohol and the dialdehyde polysaccharide from which they are formed by adding an aqueous acid such as aqueous sulfuric acid to an alcoholic solution of the acetal and heating the clear solution on a boiling water bath for a period of about one minute. The dialdehyde polysaccharide precipitates because of its known insolubility in alcohol.

The structure of the acetals of this invention is believed to be that of the simple acetal wherein cross linking is not apparent and this structure has been shown by various analytical procedures. For example, the presence of acetal fragments has been confirmed by infrared spectra. A quantitative determination of the conversion rate, for example, has been made by study of the methoxyl content of the polymeric acetal. The methyl acetals have been found to have a methoxyl content of from about 15% to 15.9% by weight. Since the methoxyl content calculated for the tetramethoyloxyacetal of dialdehyde starch,

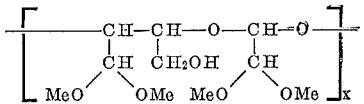

is 49% by weight, it is apparent that a maximum conversion of 32.5% has been realized. Similarly the ethoxyl content of the ethyl acetal of dialdehyde starch has been determined to be 17.3%. Correspondingly, the ethoxyl content for the tetraethoxyacetal of the polymer unit of dialdehyde starch is 58.5% which indicates a maximum conversion of about 29.5%.

Because of the fact that the acetals of this invention are not highly cross-linked and because of their outstanding solubility in various organic solvents these acetals are useful as synthetic resins. Some of the more important applications of these resins include the preparation of surface coatings, molding powders and laminating sprays. In addition since, as above explained, the entire aldehyde content of the dialdehyde polysaccharide has not been acetalized there are available in the dialdehyde polysaccharide acetal molecule unreacted carbonyl fractions which can be utilized as sites for cross-linking. For this purpose various other polymeric materials may be used for cross-linking with the dialdehyde polysaccharide acetal, so long as such polymeric materials contain fractions which are reactive with carbonyl groups, for example, amino, amido, hydroxyl and other radicals of like nature.

The invention will be better understood by reference to the following examples which are included for purposes of illustration and are not to be construed as in any way limiting the scope of this invention which is defined in the claims appended hereto.

*Example 1*

Fifty grams of dialdehyde starch from corn starch (91% oxidation 1.9% moisture), 5 grams of p-toluenesulfonic acid and 200 grams of methanol were heated with stirring at the reflux temperature of methanol (65° C.). After 5 to 6 hours the dialdehyde starch was completely dispersed, forming a slightly yellow, nearly transparent dispersion. The mixture was cooled to room temperature and 500 ml. isopropanol was added. The white precipitate was filtered, washed with isopropanol and dried in a vacuum oven at 65° C. for several hours. Yield: 46 grams.

The powder was soluble in methanol, acetone, and mixtures with water at a ratio of 1:1. It was also soluble in esters such as propyl acetate, etc. and alcohol ethers, such as ethylene glycol monoethyl or monobutyl ether, dioxane, etc., but insoluble in ethanol, isopropanol and n-butanol.

*Analytical.*—Found: C, 47.81%; H, 6.67%; OCH$_3$, 15.9%; moisture, 1.3% (K.F.) (percent C, percent H, and percent OCH$_3$ are corrected for moisture.)

The compound became yellow-brown at 180° C. and softened at 208–210° C., with decomposition.

The following example illustrates the use of a different catalyst (sulfuric acid) in the preparation of the dialdehyde polysaccharide acetals of this invention.

Example 2

Fifty grams of dialdehyde starch from corn starch (94.4% oxidation, 5.5% moisture), 300 grams of methanol and 3 ml. of a 40% aqueous sulfuric acid solution were heated with stirring between 65° C. and 67° C. for 6–7 hours until a nearly clear solution resulted. About 150 ml. of methanol was then removed under reduced pressure. The acetal was precipitated by addition of 200 ml. of isopropanol and the solid polymeric acetal filtered, washed with isopropanol and dried in a vacuum oven at 65° C. for several hours. Yield: 52 grams.

*Analytical.*—Found: C, 47.13%; H, 7.07%; $OCH_3$, 18.3%. Softening range: 175–185° C. (decomposition).

The following example illustrates the use of an autoclave in the preparation of the dialdehyde polysaccharide acetals of this invention.

Example 3

Fifty grams of dialdehyde starch from corn starch (90% oxidation, 8% moisture), 2 grams of p-toluenesulfonic acid and 200 grams of methanol were charged to an autoclave and heated under stirring at 60° C. to 65° C. for from 1.0 to 1.5 hours. The slightly yellow, clear dispersion was evaporated to half of its volume and 200 ml. isopropanol added. A white precipitate which formed was filtered and dried in a vacuum oven at 65° C. for several hours. It was found to be insoluble in water, ethanol, isopropanol, and n-butanol, but soluble in methanol, a mixture of methanol and water (1:1), acetone, methyl ethyl ketone, propyl acetate, dimethylformamide and chloroform. By heating a dispersion of the methyl acetal in a mixture of methanol-water (1:1) and in the presence of sulfuric acid the dialdehyde starch precipitated.

*Analysis.*—Found: C, 46.67%; H, 6.67% $OCH_3$, 15.0%; moisture: 2.3% (K.F.) (percent C, percent H, percent $OCH_3$ are corrected for water.)

The compound became yellow-brown at 180° C. and softened at 208–209° C. with decomposition.

This example shows that it is possible to prepare the dialdehyde polysaccharide acetals in a shorter period of time and using less catalyst by means of the use of an autoclave.

The following example illustrates the preparation of a dialdehyde polysaccharide ethyl acetal using the process of this invention.

Example 4

One hundred grams of dialdehyde starch from corn starch (90% oxidation, 8% moisture), 10 grams of p-toluenesulfonic acid and 800 grams of ethyl alcohol (96%) were heated with stirring at 78–79° C. After three hours, swelling of the polymeric dialdehyde occurred and after a total time of nineteen hours most of the starch had reacted and was dissolved in the excess of ethanol. After separation of a small amount of undissolved material, half of the ethanol was distilled under vacuum. From the remainder, the polymeric acetal was precipitated with an equal amount of isopropanol. The sticky precipitate was purified by dissolving it in a small amount of acetone and again precipitated with isopropanol. White powder was obtained after drying in a vacuum oven for several hours. Yield: 45–48 grams.

The following example illustrates the use of an autoclave for preparing a dialdehyde polysaccharide ethyl acetal and the formation of films from the product acetal.

Example 5

Forty grams of dialdehyde starch from corn starch (91% oxidation, 8% moisture), 2 grams of p-toluenesulfonic acid and 200 grams of ethanol were charged to an autoclave and heated with stirring at 100° C. for a period of three hours. From the yellow-brownish liquid the polymeric ethyl acetal was isolated by pouring it into 500 ml. of water. The white to slightly gray powder was isolated by filtration and dried in a vacuum oven at 65° C. for several hours; yield, 34 g. Part of the powder was reprecipitated by dissolving it in a small amount of acetone and then pouring this solution slowly into water and stirring.

*Analysis.*—Found: C, 49.64%; H, 7.15%, $OC_2H_5$, 17.3%; moisture: less than 0.05% (K.F.).

The compound softened at 174–186° C. and melted between 202° C. and 208° C. with yellowing. Completely clear and brittle films were obtained from solutions of the polymeric acetal in acetone.

The following example illustrates the preparation of a dialdehyde polysaccharide allyl acetal and the formation of films from the acetal.

Example 6

Fifty grams of dialdehyde starch from corn starch (95% oxidation, 2% moisture), 3 grams of p-toluenesulfonic acid, 100 grams of allyl alcohol, 25 grams of methanol and 25 grams of dioxane were charged to an autoclave and heated with stirring at 95° C. to 105° C. for 1.5 hours. The mixture was then cooled and 2.9 grams of undispersed material was separated by centrifugation from the resulting clear yellow liquid. The liquid was poured into 2000 ml. of water. The white powder which precipitated was filtered and dried under vacuum in an oven to constant weight; yield, 51 g.

Clear films were produced upon metal and glass surfaces from solutions of the acetal in acetone upon evaporation of the solvent. After curing the films at 100° C. to 150° C. for 30 minutes to 1 hour, the cured films adhered well to the surfaces to which applied and stood severe impacts and bending stresses.

The following example illustrates the use of a different dialdehyde polysaccharide (dialdehyde potato starch) in the preparation of the acetals of this invention.

Example 7

Twenty-five grams of dialdehyde starch from potato starch (93.1% oxidation, 11.1% moisture), 100 grams of methanol and 5 grams of p-toluenesulfonic acid were heated with stirring between 65° C. and 67° C. After two hours the heterogeneous dialdehyde starch dispersion became clear. About half of the methanol was then stripped off under vacuum and the remaining viscous liquid poured into 500 ml. isopropanol under stirring. The white precipitate was filtered, washed with a little isopropanol, and dried in a vacuum oven for several hours. Yield: 25 grams. The compound was soluble in methanol, acetone, toluene, and propyl acetate, but insoluble in water, isopropanol, ethanol and n-butanol.

The following example illustrates the use of still another dialdehyde polysaccharide (dialdehyde amylose) in preparing the acetals of this invention.

Example 8

Twenty-five grams of the dialdehyde of a commercially available amylose (89.1% oxidation), 100 grams of methanol and 5 grams of p-toluenesulfonic acid were refluxed under stirring. After two hours most of the dialdehyde amylose went into solution, but heating was continued for an additional six hours, at which time some material was still undissolved. After filtering from undissolved material (approximately 2–3 grams) the clear filtrate was poured, under stirring, into 500 ml. isopropanol. The white precipitate was filtered and dried in a vacuum oven at 65° C. for several hours. Yield: 15 grams. The product was soluble in methanol, acetone, esters such as propyl acetate, etc., and aromatic hydrocarbons such as benzene, toluene, etc., but insoluble in water, isopropanol, ethanol and n-butanol.

In summary, this invention provides novel acetals of dialdehyde polysaccharides which are substantially not cross-linked and which display a solubility in organic solvents which makes them useful in various resin applications. The process basically consists in the use of a ratio of from about 5 moles to 30 moles of acetalizing alcohol per dialdehyde polysaccharide polymer unit and a catalyst such as sulfuric acid or p-toluenesulfonic acid.

What is claimed is:

1. A non-cross-linked acetal of a dialdehyde polysaccharide resulting from the reaction of a dialdehyde polysaccharide with from about 5 to 30 moles per mole of dialdehyde polysaccharide polymer unit of an alcohol selected from the group consisting of methanol, ethanol and allyl alcohol in the presence of from about 4 mole percent to 20 mole percent based upon the dialdehyde polysaccharide polymer unit of a catalyst selected from the group consisting of sulfuric acid and p-toluenesulfonic acid at a temperature of from about 60° C. to 105° C. for from 1 hour to 20 hours, said acetal being soluble in benzene, toluene, ethylene glycol monomethyl ether, ethylene glycol monobutyl ether, acetone, methyl ethyl ketone, propyl acetate, chloroform, dimethylformamide, dioxane and the alcohol from which prepared and insoluble in water and other primary and secondary alcohols.

2. A process for the preparation of a non-cross-linked acetal of a dialdehyde polysaccharide which comprises reacting a dialdehyde polysaccharide with from about 5 moles to 30 moles per mole of dialdehyde polysaccharide polymer unit of an alcohol selected from a group consisting of methanol, ethanol and allyl alcohol in the presence of from about 4 mole percent to 20 mole percent based on the dialdehyde polysaccharide polymer unit of an acidic catalyst selected from a group consisting of sulfuric acid and p-toluenesulfonic acid at a temperature of from about 60° C. to 105° C. for from about 1 hour to 20 hours and thereafter precipitating the polymeric acetal thereby produced with a precipitant selected from the group consisting of water and an alcohol other than the alcohol used for reaction with said dialdehyde polysaccharide.

References Cited by the Examiner
UNITED STATES PATENTS 3,032,550   5/1962   Gugliemelli et al. ___ 260—233.3

OTHER REFERENCES

Goldstein et al.: "Chemistry and Industry," Jan. 11, 1958, pp. 40–42.

Wagner and Zook: Synthetic Organic Chemistry (1953), pages 262–263.

LEWIS GOTTS, *Primary Examiner.*

TOBIAS E. LEVOW, CHARLES B. PARKER,
*Examiners.*